(12) United States Patent
Chase et al.

(10) Patent No.: US 6,529,214 B1
(45) Date of Patent: Mar. 4, 2003

(54) INTERACTIVE PRINT JOB DISPLAY SYSTEM AND METHOD

(75) Inventors: Micah Chase, Worcester, MA (US); Brian D. Markey, Shrewsbury, MA (US); Paul Mason, Westborough, MA (US)

(73) Assignee: Checkerboard Ltd., West Boylston, MA (US)

( * ) Notice: Subject to any disclaimer, the term of this patent is extended or adjusted under 35 U.S.C. 154(b) by 0 days.

(21) Appl. No.: 09/311,918

(22) Filed: May 14, 1999

(51) Int. Cl.[7] ............................ G09G 5/00; G06F 15/00
(52) U.S. Cl. ....................................... 345/744; 707/505
(58) Field of Search ................................. 345/334, 335, 345/744, 733, 765, 700; 700/233; 707/506, 517, 542, 505; 358/1.1, 1.15, 1.18

(56) References Cited

U.S. PATENT DOCUMENTS

| | | | | |
|---|---|---|---|---|
| 5,555,496 A | * | 9/1996 | Tackbary et al. | 705/27 |
| 5,649,216 A | * | 7/1997 | Sieber | 707/506 |
| 5,748,484 A | * | 5/1998 | Cannon et al. | 700/233 |
| 5,930,810 A | | 7/1999 | Farros et al. | 707/506 |
| 5,983,243 A | * | 11/1999 | Heiney et al. | 707/500 |
| 6,012,070 A | * | 1/2000 | Cheng et al. | 707/505 |
| 6,085,126 A | * | 7/2000 | Mellgren, III et al. | 700/233 |
| 6,288,789 B1 | * | 9/2001 | Harada | 358/1.15 |

OTHER PUBLICATIONS

IBM Technical Disclosure Bulletin, "Generating compact Postscript files for both display and print", (vol. No. 35, Issue No. 4B, pp. 110–111, Sep. 1, 1992).*

Web page printout, "OurBeginning.com." http://Our beginning.com/obhome.nsf/htmlmedia/ordercontruciton.html, (Apr. 5, 1999).
Web page printout, "OurBeginning.com–Corporate Profile." http://205.152.107.163/obhome.nsf/htmlmedia/corp_profile.html, (Mar. 23, 1999).

* cited by examiner

*Primary Examiner*—Sy D. Luu
(74) *Attorney, Agent, or Firm*—David D. Lowry; Brown Rudnick Berlack & Israels LLP

(57) ABSTRACT

An interactive image display system for displaying a printed article as it will appear when printed. It includes a user interface component, to accept information from a user for producing the printed article, and to provide a graphic image representing the printed article for display to the user; a graphic layout component, to process the information and produce a graphic description file, which is usable for a batch printing process; and an image producing component, to process the graphic description file and produce the graphic image. The user interface component maintains the information from the user, allowing the user to modify a part of the information in order to view changes in the displayed printed article. This maintained information is also used for producing and displaying a different printed article, and also for ultimately preparing and running the print job for the user. The graphic layout component processes both the images for display to the user and the graphic description file for the print job, thereby guaranteeing that the user views exactly what the printed item will look like. A background image resembling the material to be printed on provides a complete picture. The present invention is well suited for use at an interactive web site allowing users to access it over the Internet, and design and order printed materials such as business cards, wedding invitations, and bar mitzvah invitations.

20 Claims, 4 Drawing Sheets

INTERACTIVE PRINT JOB DISPLAY SYSTEM AND METHOD

FIELD OF INVENTION

The present invention is directed towards image processing and display systems, and more particularly towards a printed article display system for displaying printed articles over remote connections such as the Internet.

BACKGROUND

Modern computer systems with interactive graphics have greatly enhanced the printing process, particularly in the area of pre-press setup. In the printing field, many software and computer applications allow increased speed and efficiency of jobs such as typesetting, color separation, layout and spacing calculations.

Another area which has found limited advancements in computer processing is the preprocessing and display of images which are to be printed by a batch printing process. These graphic applications often attempt to display images in a "what you see is what you get" format. However, such display systems are still problematic in that what is displayed, for example, on a computer monitor screen is not identical to what will be printed. Variations such as font sizing, layout and detail (for example dots per inch), spacing are not reproduced accurately. Often such systems use approximated font sizes, or different fonts from the actual fonts used for printing. Therefore, what is displayed is not a true image of the resulting printed article. An approximately sized font in a display image may appear to fit properly, but would overflow when actually printed.

A problem related to this font sizing is that printing and computer displays often use measurements which are not identical. In font sizing, points or picas mean different things depending on what the medium is. Specifying a font size of 12 points will mean different things depending on the font, whether it is printed or displayed on a computer monitor, or if it refers to letter height or spacing between lines. With present systems, it is difficult to present printed article image displays which can be adjusted by a naive user, and cleanly translate the changes into what is ultimately printed. Further, as exact font size and spacing calculations are not performed until the job is about to be printed, mistakes can go undetected until long after the user has selected and placed the order.

Another problem with graphic preprinting software is that such systems may only display text in black and white. Therefore if the printing process would use other colors besides black the full effect cannot be shown in the limited graphic display. Also, if the printing is to be on colored, textured or matted paper or other material, full effect of the final printed article is not viewable. The background appears white, and this limits the users ability to visualize the final product.

Yet another problem with such display systems is that they often depend on standard type alphabets, usually the standard Arabic alphabet used by English and other modem languages. In order to display different alphabets, such as Russian or Hebrew, such display systems often default to using a font consisting of Arabic letters with simply gibberish or blocked characters (called greeking) to fill in for the unusual alphabet. Again, this limits the ability to view what a final printed article will look like.

Still another problem with such interactive display systems is they are difficult to use except by trained personnel such as printing experts. However, with the advent of the Internet and other network based systems a potential market is available for allowing consumers who wish to purchase custom printed articles such as business cards, wedding invitations, bar mitzvah invitations etc., to interact with an application and produce an order for a printed article with very little human assistance. Such printing order forms, as presently available on the Internet do not allow the viewing of the final printed article in a format which exactly resembles the way the printed article will finally appear. Typically, they show standard samples which may only vaguely resemble the resulting customer order. Often, internet browsers have only a limited set of fonts available, and therefore the samples of the printed article, even if the user provides text to use, ends up having to use a "best fit" font to display the results.

SUMMARY

The present invention is directed towards an interactive image display system for displaying a printed article as it will appear when printed (subject to limitations of a display monitor). It includes a user interface component, to accept information from a user for producing the printed article, and to provide a graphic image representing the printed article for display to the user; a graphic layout component, to process the information and produce a graphic description file, which is usable for a batch printing process; and an image producing component, to process the graphic description file and produce the graphic image. The user interface component maintains the information from the user, allowing the user to modify a part of the information in order to view changes in the displayed printed article. The user can modify any of the information and layout, including change font sizes by specifying a percentage increase or decrease of a certain font. This maintained information is also used for producing and displaying a different printed article, and also for ultimately preparing and running the print job for the user.

The graphic image is displayed with a background image representing an article to be printed on, such as a paper stock. This background image is sized to be displayed as the same size as the graphic image. Many different types a backgrounds are possible, both different types of paper stocks, and other articles for printing. Other printed articles include wedding invitations, bar mitzvah and bah mitzvah invitations, birth announcements, greeting cards, holiday cards, menus, brochures, signs, banners, tee shirts, hats, etc.

The information from the user includes an indication of a predefined template including layout information for a particular printed article, including at least one area for printing. The graphic layout component uses the predefined template to produce the graphic description file, which is in a format such as Postscript. The instance of the predefined template can also be modified by the user. (change number of lines, type style) etc.

The present invention also provides graphic images representing a plurality of related printed articles from the information from the user. An example of related printed items includes a wedding invitation along with a reply card, which will include common information and font display.

The illustrative embodiment of the present invention is set up to allow users to interactively use the system over the Internet. Users can access a web site, select a printed article such as a business card, enter information and view the results. They can make changes and view the results of those changes. Users can plan and design their own printed materials. They can then place an order, wherein the order will be automatically processed.

Advantages of the present invention include the feature that an interactive user will see exactly what they will get. The displayed image is not an approximation of the printed article, it is an exact replica (subject to the limitations of the display monitor, and effects such as raised ink and paper defects and absorption). Ink colors will be properly displayed, as well as artwork and fonts. Discrepancies which are not apparent until the print job is run will not occur. For example, the image display system will not show that a line of text in a certain font will fit correctly, only to have the printer preparing to run the print job be forced to adjust the font size to keep the text from overflowing. Users can therefore safely adjust everything from point size and line spacing within boundaries as defined by the article to be printed, and be confident that they are viewing what they will order.

Another advantage of the present invention is a fully automated system which requires little or no human intervention to allow users to access, select articles, do trial and error layout, and order printed articles. Further, the entire order processing system is automated. Little human interaction is needed for production of batch printing jobs. Also, users can track their orders during all stages of the process and shipping, for example by interacting with the web site and checking with an order number.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1:
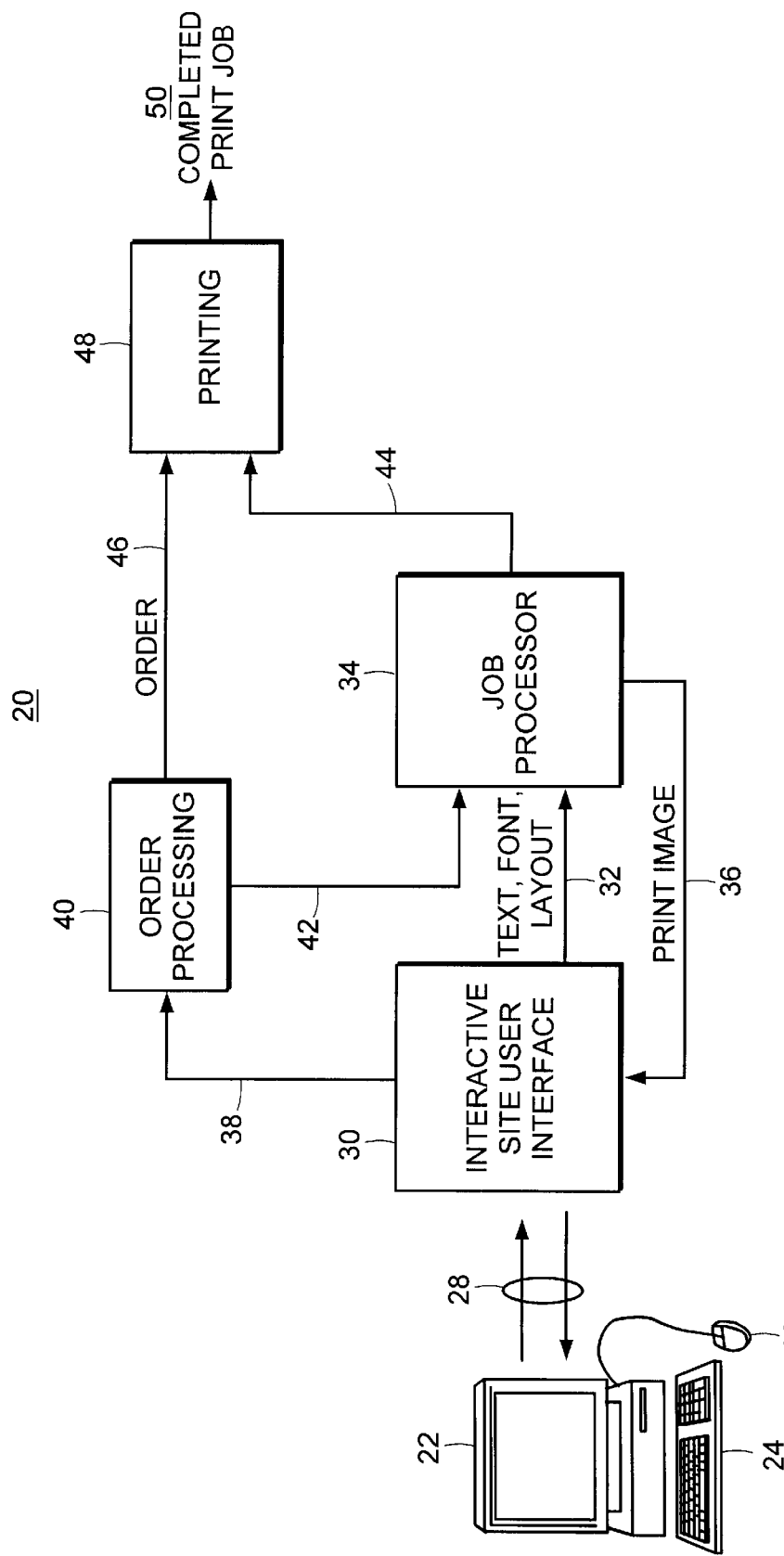
FIG. 1 is a block diagram of a system according to the present invention.

FIG. 1 displays an interactive print job display system 20 according to the present invention. A user interacts with the system 20 via a display system which commonly includes a monitor 22 with an input device such as a keyboard 24 and pointing device such as mouse 26. This display system is readily available in any typical personal computer or work station. The user communicates with the interactive site user interface 30 through a communications link 28. This communications link 28 includes any standard communication link such as modems, networks such as Ethernet and other connections. As will be discussed hereinafter the illustrative embodiment of the present invention uses the Internet with Internet browsing software such as Netscape Navigator running on a computer system with monitor 22 and an interactive web site.

The interactive site user interface 30 provides a graphic user interface to the user for entering data and placing orders for customized printed articles. The user interacts with the system by selecting a printed article, for example a business card, and entering appropriate text and layout information. The interactive site user interface 30 prompts the user for the appropriate information, collects this information, and sends appropriate information such as a selected printed article, text, font and layout 32 to a job processor 34. The job processor 34 takes this information, and produces a print image 36. The print image 36 is provided to the interactive site user interface 30 and then sent via the communications link 28 to be displayed on the monitor 22 for the user to view.

The user can make changes in the format layout or other details for the image of the printed article, whereupon the interactive site user interface 30 receives updated information, which is provided to the job processor 34. The job processor 34 then produces a new print image 36 for display back on the monitor 22. Through this cyclic interaction, a user is able to experiment and try variations in a low-pressure environment, and ultimately produce a desired customized article for printing.

Once the user is satisfied with the appearance of the article for printing, the user places an order on-line through the same display system whereupon the interactive site user interface 30 provides the order information to an order processing unit 40. The information 38 sent to order processing unit 40 includes an identification of the article for printing (such as a business card), text, font and layout information as necessary for order processing unit 40 to produce a print order. Other information such as billing information, order processing number, order confirmation, shipping address and special instructions may also be included.

The order processing unit 40, upon determining to print the order provides print information 42 to the job processor 34. This print information 42 is the same text and font layout information 32 as provided by the interactive site user interface 30. The same job processor 34 which produces the print images 36 for display to the user during the selection process is the same job processor 34 which produces the output image 44 used in the batch printing process 48. By using this same job processor 34, the present invention guarantees that the completed print job 50 will appear exactly the same as the print image 36 which was displayed to the user. Alternatively, the present invention can store the final user-approved print image 36 and use it for the output image 44, thereby avoiding re-running the job processor 34.

Other information needed for printing 48 is supplied by the order processing unit 40 as shown by arrow 46. Printing is performed by any available batch printing method, including standard offset, multi-colored offset, or high speed four color copying systems.

Figure 2:
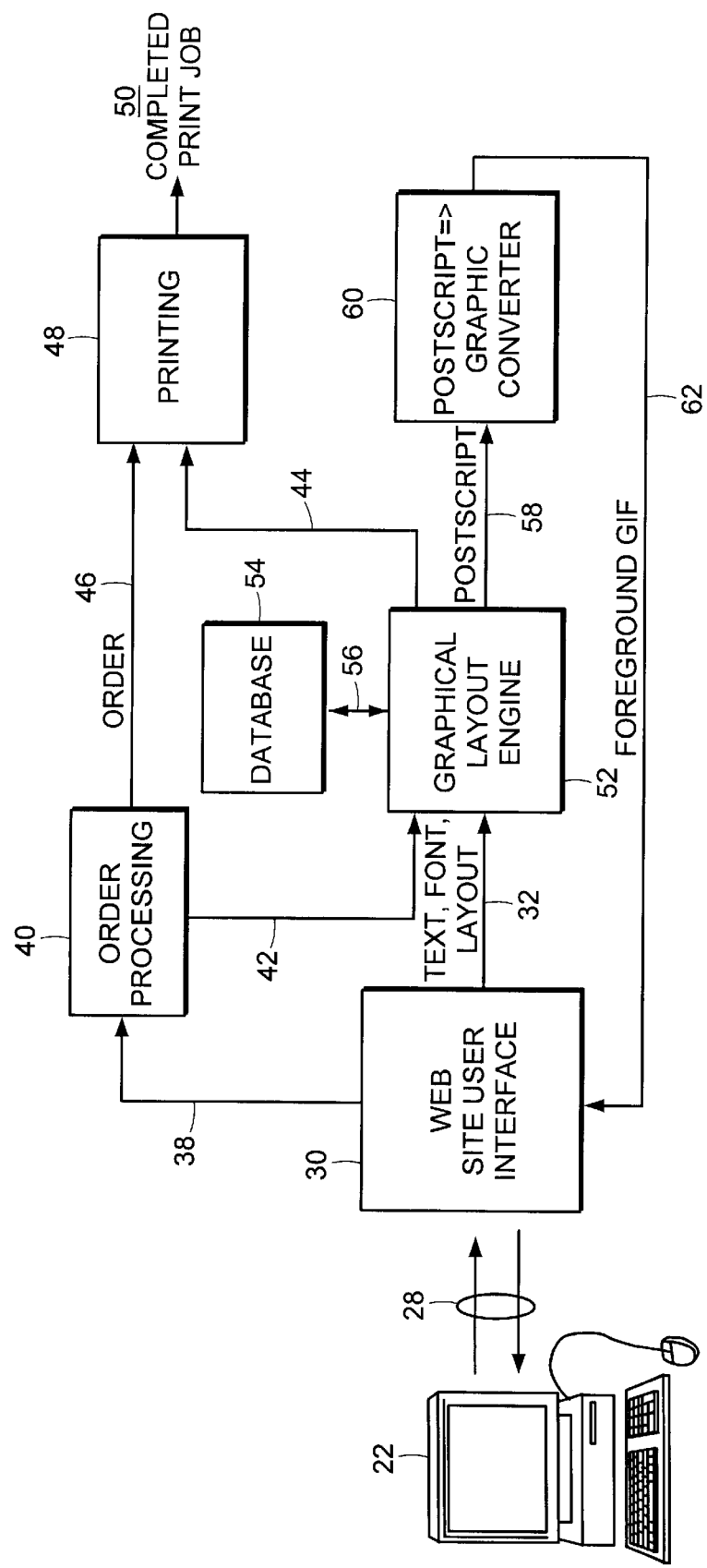
FIG. 2 is a block diagram of an illustrative embodiment of the present invention.

An illustrative embodiment of the present invention is shown is FIG. 2. The user interacts with a monitor 22 or other display device running any available web browser system for interacting with the world wide web, including personal computers running Netscape Navigator®, Web TV or any other interactive systems. The system with monitor 22 communicates over the Internet by standard techniques, as shown by arrow 28 to a web site 30 which provides a web site with an interactive order form user interface. The web site user interface 30 provides interactive screen displays allowing a user to select a printed article such as business card, and enter information to be displayed on the business card as well as layout, colors, and paper stock for the final product. In the illustrative embodiment, the user first selects an article to be printed, and then is presented with screen including several form fields for entering the text for each section of that specific printed article. For example, with a business card, the screen includes form fields for name, address, telephone and fax numbers as well as email address. Other optional fields for text are also provided, further depending on the context, some fields may include predefined values which may not be editable, for example on business cards for individuals at one company, where the company address is the same for all cards.

When a user has provided the text information and layout information, the web site user Interface 30 provides text, font and layout information 30 to a graphical layout engine 52. The text, font and layout information 32 from the web site user interface 30 includes a template identifier for identifying which template the graphic layout engine 52 should use. In the example of a business card, the template identifier will identify a template set up for filling in information on a predefined business card. Templates will be discussed in more detail below.

These templates are predefined and are stored in a database 54. Using the template identifier, the graphical layout engine 52 communicates with the database 54 through a communication link 56. Alternatively, the database 54 is an integral part of the graphical layout engine 52. The correct template is loaded into graphical layout engine 52. Then the graphical layout engine 52 processes the template image using the text and font information 32 provided by the user to produce an output image 58. In the illustrative embodiment, the output image 58 is in Postscript file format. For the illustrative embodiment, the graphical layout engine 52 is Act 1 and Act 2 as produced by Hence EDP of Ventura, Calif. The Act 1 and Act 2 systems provide graphical layout and output of print information including Postscript output which may be used for creating printing plates for batch offset printing. More details of this system will also be provided below.

The output Postscript file 58 for display to the user on the monitor 22 is processed by a Postscript to graphic converter 60. This Postscript to graphic converter 60 converts the Postscript file to a format which may be sent to and displayed on the monitor 22. In the illustrative embodiment, the Postscript file 58 is converted into a GIF (Graphics Interchange Format) file, although other formats such as JPEG or TIFF can also be produced. In the illustrative embodiment, the postscript to graphic converter 60 is a program called Image Alchemy which converts the Postscript file into a GIF file 62.

In the illustrative embodiment, the GIF file 62 is produced and displayed as an image foreground. GIF files may be displayed by presenting two images, a foreground image and a background image. The foreground image can be created with transparent sections, whereupon the background image is visible. When the foreground and background images are combined, a complete picture is produced. For the present invention, by using a foreground GIF 62 file, the background may be selected from an image representing an article for printing, for example paper stock. The paper stock may be a single solid color or a compound surface such as a marbleized or matte surface etc. As previously mentioned, other articles for printing such as a T-shirt, hat or a restaurant menu can be used as background images. Alternatively, users can provide their own background images, and see what the image sill look like with printing placed on it. The system would allow the user to provide a GIF or other format background image which would be uploaded and used as a background, or stay resident on the users's browser.

The web site user Interface 30 receives the foreground GIF image 62 and provides it and an background image to the user display or monitor 22. The background is selected by the user selecting a certain paper stock, or if a certain stock is attached to a certain template identifier, that background image will be used. The image size for the background is selected to match the foreground size as defined by the foreground GIF image 62. The background image size may be adjusted by tiling a small image to fill in the appropriate size, or by clipping or resizing a background image as appropriate. Alternatively, for certain printed articles such as business cards, background images properly sized for business cards may be provided.

Alternatively, the Postscript to graphic converter 60 may produce from the Postscript file 58 a single image file 62 which includes both a foreground and a background.

Upon viewing the displayed image on the display monitor 22, a user can modify the displayed image by editing the previously entered text, or changing the appearance (font, font size, color, spacing etc.). All the previously entered information is maintained by the web site user interface, and available in the data entry fields so the user can easily make changes and adjustments without having to re-enter data. If the user changes to a new article for printing, for example a different business card with a different layout, the previously entered text for printing on the business card does not need to be reentered. Other adjustments are also simple. In the present invention, the font size can be adjusted by specifying a percentage change amount, for example requesting 110%, 75% 150% of the present font size, or requesting for example "10% larger", "25% smaller" of the present font size. The user can also specify point sizes if desired.

After the user has made changes as desired, the information is again sent to the web site user Interface 30, which submits the proper information to the graphical layout engine 52 to produce a new postscript file 58, which is processed as previously described and displayed to the user.

When the user is satisfied and wishes to place an order, the user activates the appropriate mechanism, typically by activating a screen button saying "Order Now". In the illustrative embodiment, the user is then presented with other screens for data entry. Such data entry includes payment information such as a customer order number, or credit card ordering information. These data entry screens can include secure connection web pages to maintain privacy of customer information. Other information collected includes a shipping address and any special instructions. The web site user Interface 30 then provides the order information 38 to the order processing unit 40. In the illustrative embodiment, the order processing unit 40 creates an order number for the order. This order number keeps track of the information, and the order processing process, including whether a confirmation has been received to proceed with the printing of the order. This printing confirmation may take the form of a credit approval for credit card information or purchase order information provided from the user, or other confirmation including a timing to run a certain number of received orders at one time.

When the order processing unit 40 determines that an order is to be printed, the order processing unit 40 provides the layout and template information 42 to graphic layout engine 52 which in the illustrative embodiment is Act 2 from Hence EDP. The graphic layout engine 52 again queries and receives data from the database 54 regarding the template and additionally may include information about various texts to display in various areas and sections of a template as will be described below. The graphical layout engine 52 then produces a Postscript file 44 which is used for preparing a printing plate for the printing process 48. When producing a Postscript file 44 for printing, the graphic layout engine may produce a slightly different Postscript file 44 from the Postscript file 58 for image display, in that it may have a larger border to accommodate spacing around the printing plate for margins and trimming. However, the text and font layout as contained within the Postscript file for printing 44 is substantially identical to the Postscript file for image display 58.

The printing process 48 is performed by any standard printing system including prepress preparation of print film or plate, for example by taking the Postscript file 44 and producing an offset plate for printing on an offset printer. If multiple colors are used, color separation files can be performed. Although the printing process is described using preprinting production of plates, other methods are available including providing the postscript data to high speed copying or image producing machines which automatically provide layout for batch print jobs, or alternatively to printing presses which are designed to automatically receive Postscript files and automatically produce printing plates and run printing jobs with very little intermediate preparation.

Figure 3:
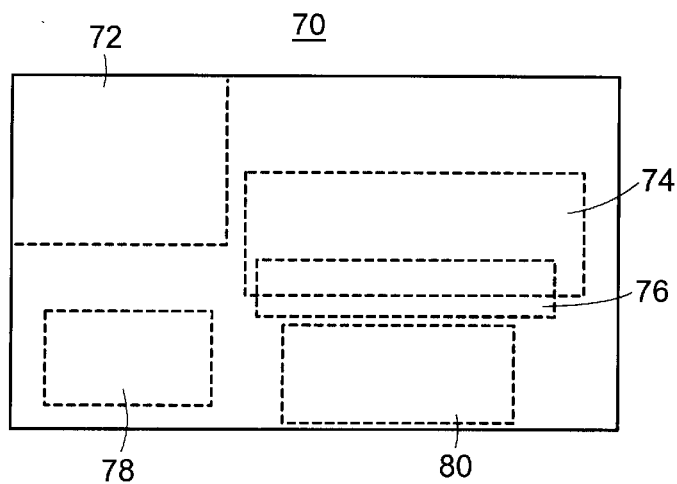
FIG. 3 is an example template layout for a printed article showing areas.

FIG. 3 shows a graphical representation of an example template 70 for layout of a business card. The template includes a one or more areas 72–80, which are configured to hold layouts such as text and graphics. The top left area 72 can be to hold a graphic representing the logo for a company. The main text area 74 would usually display the person's name, title and address, etc. Areas can overlap each other, as shown by the area 76 which overlaps the main text area 74.

A template area is configured with rules to display a specific font, in a specific color, with a certain format, leading (spacing) and area filling. The template is stored in the database 54. When a template is uploaded, the descriptions for each area are also uploaded. When the graphical layout engine 52 receives text to print in a certain area, the line is indexed into a specific line in a specific area on a specific template. The database is configured to allow storing text for a specific print job (as indexed by an order number), however, this feature is not presently being used.

The graphical layout engine takes the user supplied information for each area, and produces the output Postscript file 58 based on the template and areas. The fonts and layout of each area can be adjusted as desired to override the initial default rules. For example the font may be shrunk by a percentage for one area.

Figure 4:
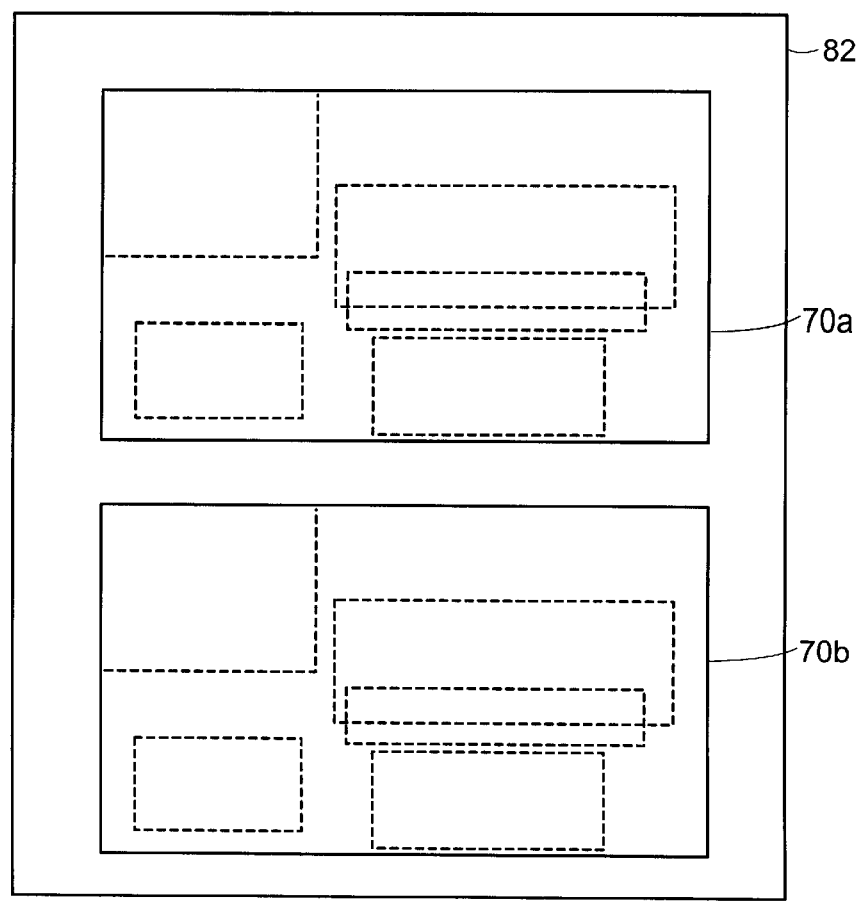
FIG. 4 shows placement of example template layouts on a printing plate as produced in accordance with the present invention.

The graphical layout engine also accepts a description of a printing plate on which the image will be transferred to for printing. The description includes a size for the printing plate, so that the Postscript file 58 will be created to correctly fit and be positioned on the printing plate. For producing images for display to a user, the printing plate is a same size as the image size, so that it exactly fits. However, when producing a Postscript file 44 for printing, a different printing plate description is provided, as shown in FIG. 4. In this example, the printing plate 82 is larger than the two template images 70a and 70b, with a border around both. Here, the printing plate description is configured to group two (same or different) business card images together to be printed at once, wherein the printing process will print two business cards on each sheet. The sheets would then be cut and trimmed to produce the final business cards. By providing the graphical layout engine 52 with the printing plate description, it will produce a Postscript file 44 which is properly configured and laid out to fit on the printing plate without further adjustment.

Similarly, image placement on a plate can overlap. This is useful for displaying printed Darticles which have more than one printed surface. For example, an ornate invitation will have a large background piece from one paper stock, with a smaller foreground piece positioned and glued together to form a framed invitation. The background piece forms a frame around the smaller foreground piece. Both the background piece and foreground piece have printing; the printing on the background piece is in the border, and will be visible when the invitation is finally assembled. While the printing process usually requires printing each piece separately and then gluing them together; the ability to overlap plates allows the present invention to produce a viewable image of what the final result will be. When processing the data for a display image, the resulting Postscript File will have the foreground and background printing overlap on the printing plate. Therefore when the image is displayed, the image will appear with all the printing properly placed. In this case, a background image which shows what the two pieces (foreground paper and background border paper) look like, thereby producing a complete and accurate image.

Figure 5:
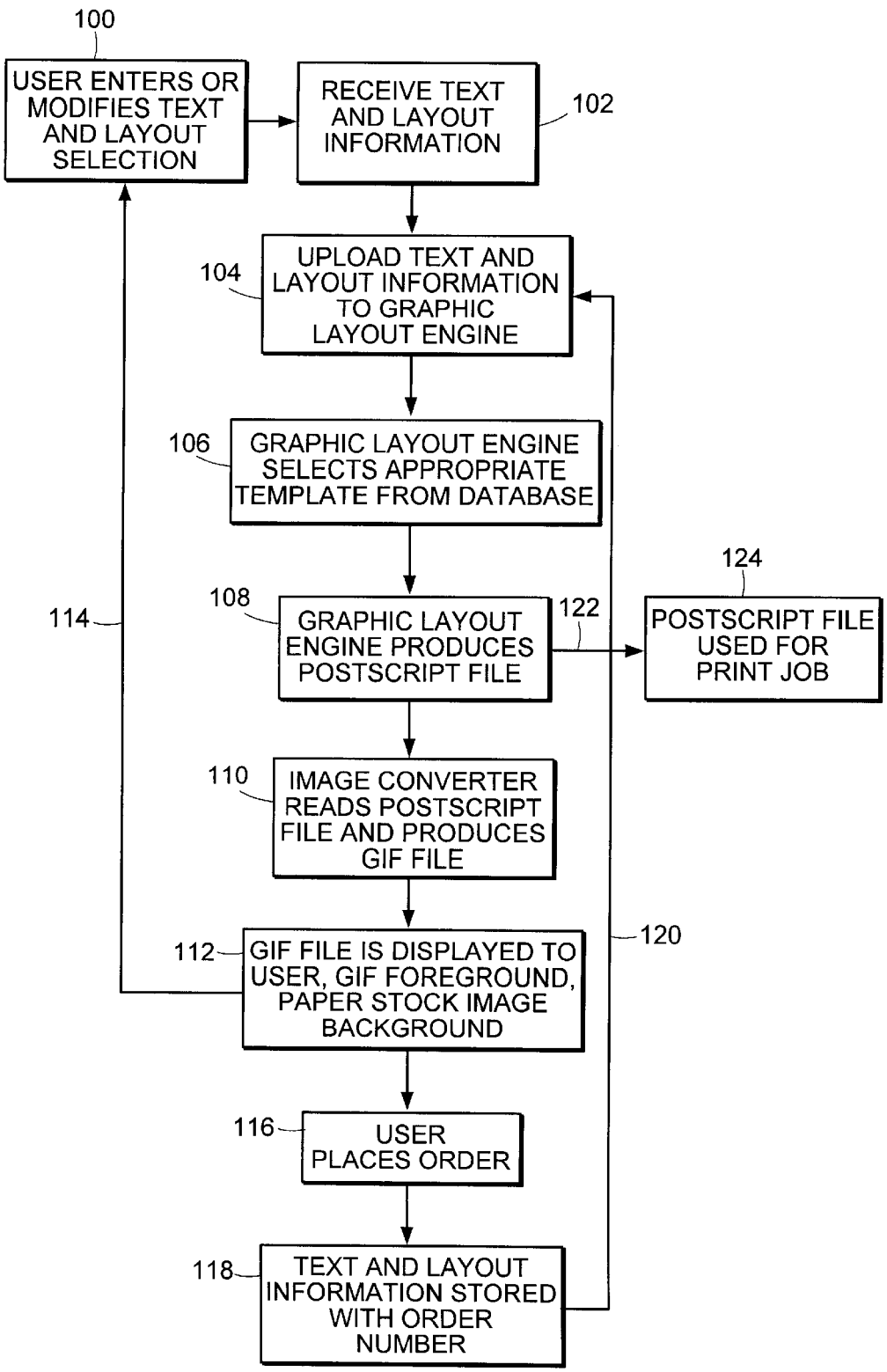
FIG. 5 is a flowchart of steps performed according to the illustrative embodiment of the present invention.

Turning now to FIG. 5, the steps used by the illustrative embodiment of the present invention are discussed. First the user enters or modifies text and layout selection as shown in step 100. The user accesses the system, typically by accessing the web site, selects one of the printed articles the user wishes to order, and proceeds to a data entry screen. The data entry screens are implemented using HTML (HyperText Markup Language) with Javascript functions. Different printed articles have different data entry screens, which have data fields as required for the printed article.

If a user needs to enter text to be printed in a non-Arabic alphabet, for example Hebrew text to be printed on an invitation to a Bar Mitzvah, the user can indicate this on the data entry screen. In the illustrative embodiment, the user is instructed to enter the text "[H]" in a data field. This will bring up a separate screen which displays characters and alphabets matrix whereupon the user can click on each character in turn to spell out the appropriate text. This entry is only used for data entry, because the present invention properly handles different fonts and alphabets correctly (including languages which are read and written right to left), and the resulting displayed image is completely accurate.

Once the user enters the information, the text and layout information is sent over the Internet to the web server, step 102. The web server is implemented using Active Server Pages from Microsoft Inc., which will run preselected programs and wait for results before displaying further pages. For the illustrative embodiment, the web server sends the information to a separate machine which activates a batch program which controls the production of the display images. The text and layout information is then passed to the graphic layout engine, step 104. For the illustrative embodiment, the ACT 2 program is activated and passes parameters. Layout information includes font information, and a template identifier for a predefined template which is stored in the database. Also, an order number is supplied, which allows the graphic layout engine to store information regarding the text in the database, although this presently is not used.

The graphic layout engine uploads the appropriate template from the database performs the calculations and production, step 106. The result is a postscript file, step 108.

For displaying the image to users, the produced Postscript file is sized to fully fill the area (no margin around it for the plate). For image display, the Postscript file is created with no background color. The postscript file is stored, and the batch file next activates the postscript to image converter program is run, which reads in the Postscript file and outputs a GIF foreground image file, step 110. This file and a background GIF file representing the background image is then sent by FTP to the web server for display to the user, step 112. The web server creates an HTML page for displaying to image, using the GIF foreground image file size to create a table cell sized hold the image, which thereby determines the size for the corresponding background image. The display page is then sent to the user over the Internet.

The user can then either make modifications to the display as shown by step 114 which allows the process to be repeated again as needed, or the user can place an order, step 116. The user can enter extra order information including payment options, shipping address, and any special instructions for the order.

If the user places an order, the system will store the text and layout information along with an order number for processing as shown by step 118. In the illustrative embodiment, the information is uploaded again, except this time with a "real" order number. This order number helps track the order, which may include several parts. For example, a wedding invitation often will have an invitation and response card. The same font and ink color will be used for the response card which is part of the same order. Other items such as standard text may be defaulted from the entered text (for example, addresses), or the user can customize other parts of the order using the same display system.

Alternatively, the user may store order information on the system, but not actually place the order yet. This allows the user to come back to the site and access the previously entered information and layout. The user can then make changes and they please, and finally place a real order.

Once the order is complete, which may involve waiting for completion of an automatic credit authorization, the order is processed. If special instructions are present, the order will not be automatically processed, but will alert an operator to review the order and special instructions. When the order is processed, the text and layout information including the order number is uploaded to the graphic layout engine as shown in step 104 by arrow 120. The graphic layout engine will then again select the appropriate template from the database step 106, and produce a postscript file, step 108. A different plate setup is used for the output, which includes providing a larger plate surface than the actual image, as is needed for printing setup. Further, multiple images may be placed in one Postscript file, allowing the printing plate to have several images for different printed items to facilitate printing all parts of an order at once, for example a wedding invitation and reply card. Also, different print orders for unrelated jobs can be put on one plate, to allow one print run to complete multiple jobs. The Postscript file can also be created and configured to allow images to overlap or be superimposed over other images, to facilitate specialty printing such as multi-layered invitations.

The Postscript file is finally sent as shown by arrow 122 to be printed as a print job, step 124. At that point, the order is processed in a standard manner for printing, packaging and shipping.

The illustrative embodiment of the present invention runs on a single Pentium® based single or multiple processor system running Microsoft Windows NT®. The illustrative embodiment also runs with multiple separate networked computers. The web site user interface 30 runs on one machine, with information passed through a network to another machine running the graphical layout engine 52, and the graphic converter 60. The database 54 may also be installed on the second machine. As the processing requirements for the present invention grows, the database 54 can be placed on a separate database server machine, which is accessible by a plurality of networked job processors 34 (which can include graphical layout engines 52 together with graphic converters 60), and one or more separate web site user interface machines 30. In this way, if more job processing power is needed, a new machine can simply be networked in, and perform job processing in parallel with the other machines. Alternatively, some of the processing, such as user interaction for obtaining information, step 100 FIG. 5, may be performed locally on a user's browser by using Javascript.

Although the illustrative embodiment has been described in terms of allowing users and customers to access the system remotely for example over the Internet, the present invention is also useful to professional graphics designers and printing shops. The present invention may be used to quickly provide accurate displays of printed images, including the ability to interactively change and modify the information and experiment with changes, such as trying any different backgrounds. In fact, the present invention can support both employees and staff of a printing shop with layout support while simultaneously providing service to outside users and customers (and remote employees) over the Internet, or by dial-up or cable modems.

The present invention is also useful in places with customer access other than through the internet. For example, standalone kiosks or machines in stores, malls and conferences centers can provide the same service. The present invention can be entirely contained within the kiosk, with the job processor 34 running on locally contained computer, or processing can be performed remotely, for example over a dedicated phone line, or over a network or even the internet.

Although the invention has been shown and described with respect to illustrative embodiments thereof, various other changes, omissions and additions in the form and detail thereof may be made therein without departing from the spirit and scope of the invention.

What is claimed is:

1. An interactive image display system for displaying a printed article as it will appear when printed, comprising:
   a user interface component, to accept information from a user for producing said printed article, and to display a graphic image representing said printed article to said user;
   a graphic layout component, to process said information and to produce a graphic description file based on said information, said graphic description file being the only file needed for a batch printing process for printing said printed article; and
   an image producing component, to process said graphic description file and produce said graphic image based on said graphic description file, said graphic image for display to said user by said user interface component.

2. The interactive image display system of claim 1, wherein said user interface component maintains said information from said user, allowing said user to modify a part of said information in order to view changes in said displayed printed article.

3. The interactive image display system of claim 2, wherein said user interface component maintains said information from said user, allowing said graphic layout component to produce a graphic description file, and said image producing component to produce a graphic image for a different printed article.

4. The interactive image display system of claim 3 wherein said information maintained by said user interface component is used for preparing a print job for said user.

5. The interactive image display system of claim 1 wherein said graphic image is displayed with a background image representing an article to be printed on.

6. The interactive image display system of claim 5 wherein said background image is an image of paper stock to be printed on.

7. The interactive image display system of claim 5 wherein said background image is sized to be a same size as said graphic image.

8. The interactive image display system of claim 1, the user can modify font sizes by specifying a percentage increase or decrease.

9. The interactive image display system of claim 1 wherein said graphic description file is a Postscript file.

10. The interactive image display system of claim 1 wherein said information from said user includes an indication of a predefined template, said predefined template including layout information for a printed article; and said graphic layout component, uses said predefined template to produce said graphic description file.

11. The interactive image display system of claim 10 wherein said predefined template includes at least one area for printing.

12. The interactive image display system of claim 1 wherein said interactive image display system provides graphic images representing a plurality of related printed articles from said information from said user.

13. The interactive image display system of claim 1 wherein said user interface component interacts with said user over the Internet.

14. On a computer system, a method of displaying a printed article as it will appear when printed, comprising:

obtaining text information to be printed on said printed article;

selecting a predefined template, said predefined template including at least one area for printing;

producing a graphic description file based on said text information and predefined template, said graphic description file to be used in a printing process to produce said printed article, wherein only said graphic description file needed in said printing process;

processing said graphic description file into a graphic image for display on a display device, said processing including providing a background image for said graphic image, wherein said background image representing an article to be printed on.

15. The method of claim 14 wherein said provided background image is an image of paper stock to be printed on.

16. The method of claim 14 wherein said step of providing a background image for said graphic image, includes providing said background image which is a same size as said graphic image for display.

17. The method of claim 14 further including the steps of:

upon receiving an indication that said printed article is to be printed, storing said text information and an indication of said selected predefined template along with an order indication number; and upon receiving an indication that said printed article is ready to be printed, producing a graphic description file based on said text information and predefined template, said graphic description file to be used for said printing process.

18. An interactive image display system for displaying a printed article as it will appear when printed, comprising:

means for interacting with a user for obtaining and modifying information for producing said printed article;

processing means for processing said information and producing a graphic description file based on said information, said graphic description file being the only file needed for printing said printed article;

display means for reading said graphic description file and displaying an image corresponding to said graphic description file of said printed article to said user for viewing; and storage means for storing said graphic description file for printing said printed article.

19. The interactive image display system of claim 18 wherein said printed article includes a plurality of related printed articles, said plurality of related printed articles each using at least a part of said information from said user.

20. The interactive image display system of claim 18 wherein said means for interacting with a user includes an interactive web site remotely accessible users.

* * * * *

;

(12) EX PARTE REEXAMINATION CERTIFICATE (7470th)
United States Patent
Chase et al.

(10) Number: US 6,529,214 C1
(45) Certificate Issued: Apr. 27, 2010

(54) INTERACTIVE PRINT JOB DISPLAY SYSTEM AND METHOD

(75) Inventors: Micah Chase, Worcester, MA (US); Brian D. Markey, Shrewsbury, MA (US); Paul Mason, Westborough, MA (US)

(73) Assignee: Checkmate Technologies LLC, West Boylston, MA (US)

Reexamination Request:
No. 90/010,163, May 12, 2008

Reexamination Certificate for:
Patent No.: 6,529,214
Issued: Mar. 4, 2003
Appl. No.: 09/311,918
Filed: May 14, 1999

(51) Int. Cl.
*G06Q 30/00* (2006.01)
G06F 15/00 (2006.01)

(52) U.S. Cl. .................... 715/744; 715/234
(58) Field of Classification Search .................. None
See application file for complete search history.

(56) References Cited

U.S. PATENT DOCUMENTS 5,930,810 A * 7/1999 Farros et al. ............. 715/201

6,288,789 B1 * 9/2001 Harada ..................... 358/1.15

\* cited by examiner

*Primary Examiner*—Sam Rimell

(57) ABSTRACT

An interactive image display system for displaying a printed article as it will appear when printed. It includes a user interface component, to accept information from a user for producing the printed article, and to provide a graphic image representing the printed article for display to the user; a graphic layout component, to process the information and produce a graphic description file, which is usable for a batch printing process; and an image producing component, to process the graphic description file and produce the graphic image. The user interface component maintains the information from the user, allowing the user to modify a part of the information in order to view changes in the displayed printed article. This maintained information is also used for producing and displaying a different printed article, and also for ultimately preparing and running the print job for the user. The graphic layout component processes both the images for display to the user and the graphic description file for the print job, thereby guaranteeing that the user views exactly what the printed item will look like. A background image resembling the material to be printed on provides a complete picture. The present invention is well suited for use at an interactive web site allowing users to access it over the Internet, and design and order printed materials such as business cards, wedding invitations, and bar mitzvah invitations.

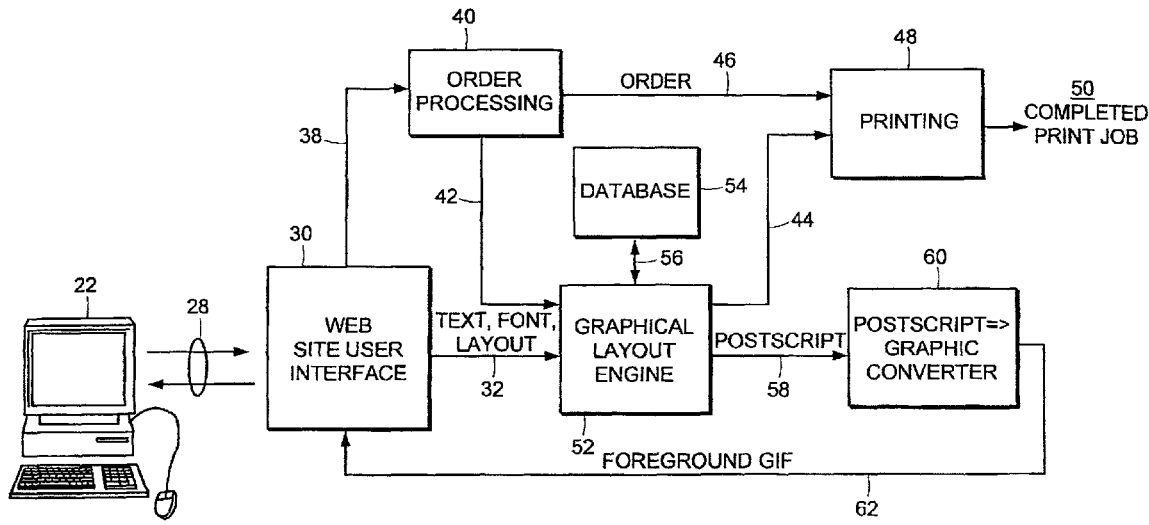

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 14, 17, and 18 are determined to be patentable as amended.

Claims 2–13, 15–16, 19–20 dependent on an amended claim, are determined to be patentable.

1. An interactive image display system for displaying a printed article as it will appear when printed, comprising: a user interface component, to accept information from a user for producing said printed article, and to display a graphic image representing said printed article to said user; a graphic layout component, to process said information and to produce a graphic description file based on said information, said graphic description file being the [only] *same* file needed for a batch printing process for printing said printed article *and for producing said graphic image;* and an image producing component, to process said graphic description file and produce said graphic image based on said graphic description file, said graphic image for display to said user by said user interface component.

14. On a computer system, a method of displaying a printed article as it will appear when printed, comprising: obtaining text information to be printed on said printed article; selecting a predefined template, said predefined template including at least one area for printing; producing a graphic description file based on said text information and predefined template, said graphic description file [to be] *being the same file* used in a printing process to produce said printed article *and in producing a graphic image,* wherein only said graphic description file *is* needed in said printing process; processing said graphic description file into [a] *said* graphic image for display on a display device, said processing including providing a background image for said graphic image, wherein said background image representing an article to be printed on.

17. The method of claim 14 further including the steps of: [upon] receiving an indication that said printed article is to be printed [,]; storing said text information and an indication of said selected predefined template along with an order indication number; [and upon] receiving an indication that said printed article is ready to be printed[,]; *and* producing a graphic description file based on said text information and predefined template, said graphic description file to be used for said printing process.

18. An interactive image display system for displaying a printed article as it will appear when printed, comprising: means for interacting with a user for obtaining and modifying information for producing said printed article; processing means for processing said information and producing a graphic description file based on said information, said graphic description file being the [only] *same* file needed for printing said printed article *and producing a graphic image;* display means for reading said graphic description file and displaying [an] *said graphic* image corresponding to said graphic description file of said printed article to said user for viewing; and storage means for storing said graphic description file for printing said printed article.

\* \* \* \* \*